United States Patent [19]

Unger

[11] Patent Number: 5,369,149
[45] Date of Patent: Nov. 29, 1994

[54] METHOD FOR CONTINUOUSLY PREPARING THERMO-CROSSLINKABLE AND/OR THERMOPLASTIC ELASTOMER BLENDS

[75] Inventor: Jacques Unger, Zofingen, Switzerland

[73] Assignee: Gezolan AG, Dagmersellen, Switzerland

[21] Appl. No.: 959,694

[22] Filed: Oct. 13, 1994

[51] Int. Cl.$^5$ .......................... C08J 3/24; C08J 3/22; C08J 3/20
[52] U.S. Cl. ................... 523/353; 523/351; 523/324; 264/211.24
[58] Field of Search ............. 523/324, 353, 351; 264/211.24

[56] References Cited

U.S. PATENT DOCUMENTS

| | | | |
|---|---|---|---|
| 2,333,786 | 11/1943 | Hessen | 523/324 |
| 3,007,885 | 11/1961 | Oldham et al. | 523/324 |
| 4,001,172 | 1/1977 | Steinkamp et al. | 524/504 |
| 4,161,419 | 7/1979 | Alia | 156/51 |
| 4,321,168 | 3/1982 | Ueda et al. | 523/353 |
| 4,357,432 | 11/1982 | Edwards | 523/351 |
| 4,737,561 | 4/1988 | Stary et al. | 523/353 |
| 4,773,624 | 9/1988 | Affenzeller et al. | 523/351 |
| 4,774,277 | 9/1988 | Janac et al. | 524/474 |

OTHER PUBLICATIONS

"Turbomixing", Drais Corporation Bulletin, Zurich, Switzerland (no date given), pp. 1–9.
Encyclopedia of Chemical Technology, vol. 9, (New York, 1952), pp. 164–165.

*Primary Examiner*—Paul R. Michel
*Assistant Examiner*—Andrew E. C. Merriam
*Attorney, Agent, or Firm*—Tarolli, Sundheim & Covell

[57] ABSTRACT

A method for preparing thermo-crosslinkable and/or thermoplastic elastomer blends by mixing the elastomer with plasticizer oil and other additives, said method comprising the steps of:

(a) continuously premixing the crushed elastomer in an annular zone mixer with at least part of said plasticizer oil, and optionally with at least part of said other additives, to form a preblend in which said elastomer is decomposed and said additives are embedded in the polymer matrix;

and thereafter (b) completing the mixing of said premix, and optionally of the remainder of said additives, in a mixing unit working batchwise or continuously.

22 Claims, No Drawings

METHOD FOR CONTINUOUSLY PREPARING THERMO-CROSSLINKABLE AND/OR THERMOPLASTIC ELASTOMER BLENDS

TECHNICAL FIELD

This invention relates to a method for preparing thermo-crosslinkable and/or thermoplastic elastomer blends.

"Thermoplastic elastomers (TPE)" is the generally accepted designation for materials in which the elastomeric phases (as soft component) are embedded in plastic material (as hard component). Depending on the nature of this embedding one distingishes between block copolymers and polyblends.

Furthermore, the thermoplastic elastomers may be classified as follows:
1 Types having high hardness
  1.1 Copolyesters
  1.2 Polyether block amides
2 Types having low hardness
  2.1 Thermoplastic polyurethanes (TPU)
    2.1.1 Polyetherurethanes
    2.1.2 Polyesterurethanes
  2.2 Thermoplastic polyolefins (TPO)
    2.2.1 Ethylene-propylene-diene elastomer/polypropylene (EPDM/PP)
    2.2.2 Acrylonitrile-butadiene copolymer/polypropylene (NBR/PP)
  2.3 Styrene block copolymers
    2.3.1 Styrene-butadiene-styrene triblock copolymer (SBS)
    2.3.2 Styrene-ethylene/butylene-styrene triblock copolymer (SEBS).

BACKGROUND OF THE INVENTION

The preparation of thermo-crosslinkable and/or thermoplastic elastomer blends, in particular of vulcanizable rubber blends, can be effected batchwise or continuously, for example on a calender or in an internal mixer. In both cases, the duration of the mixing process is important, so that only moderate throughputs can be obtained.

However, the use of an internal mixer has the disadvantage that, due to the applied speed of rotation, the crude rubber blend is so strongly heated that for many mixture formulations no crosslinking reagents can be added. Therefore, it is often necessary either
  to arrange a calender downstream of said internal mixer and to add sulfur and accelerators to the crude blend removed from the internal mixer on said calender only;
or alternatively
  to prepare a preblend without sulfur and accelerator in a first mixing passage through said internal mixer, and thereafter to prepare the final blend with addition of sulfur and accelerator in a second mixing passage through said internal mixer.

So far, the attempts for achieving a continuous mixing in mixing extruders has failed for the abovementioned compulsion of observing this order. Calculations show that a spindle length of the order of 40 times diameter would be necessary (D being the spindle diameter). This is technically difficult to realize and economically unattractive.

Furthermore, the use of plasticized elastomers or the addition of large quantities of plasticizers is critical since the shearing forces produceable in the mixture are no longer sufficient for a regular mixing.

OBJECTS OF THE INVENTION

It is a primary object of the present invention to provide a method for preparing thermo-crosslinkable and/or thermoplastic elastomer blends, which method avoids the abovementioned disadvantages of the prior art.

It is a further object of the invention to provide such a method which considerably shortens the duration of mixing.

It is a still further object of the invention to provide a method for continuously preparing thermo-crosslinkable and/or thermoplastic elastomer blends, in particular vulcanizable rubber blends, which method allows the use of simple mixers or mixing extruders.

SUMMARY OF THE INVENTION

To meet these and other objects, the present invention provides a method for preparing thermo-crosslinkable and/or thermoplastic elastomer blends by mixing the elastomer with plasticizer oil and other additives, said method comprising the steps of:

(a) continuously premixing the crushed elastomer in an annular zone mixer with at least part of said plasticizer oil, and optionally with at least part of said other additives, to form a preblend in which said elastomer is decomposed and said additives are embedded in the polymer matrix;
and thereafter
(b) completing the mixing of said premix, and optionally of the remainder of said additives, in a mixing unit working batchwise or continuously.

In the method according to the invention, said annular zone mixer of said first step (a) has the function of decomposing the elastomer to such an extent that a mixing with the adjuvants becomes possible. Thus a large part of the total mixing process is effected in said annular zone mixer, whereas the function of said mixing unit of said second step (b), for example an internal or Banbury type mixer or mixing extruder, is reduced to a simple aftermixing. This was most surprising to a person skilled in the art.

DESCRIPTION OF THE PREFERRED EMBODIMENTS

In applying the method according to the invention, all known groups of adjuvants can be used, that is to say:
1 Crosslinking systems, in particular vulcanization agents.
2 Fillers, namely:
  2.1 Active fillers which result in a decisive improvement of the mechanical properties, particularly of the tensile strength and the abrasion resistance, such as: types of active black carbon, aluminium and calcium silicate, and zinc oxide; or
  2.2 Inactive fillers which do not result in a quantitative improvement of the vulcanized goods, for example calcium and magnesium carbonate, kaolin, barite, kieselguhr, and various clays;
  2.3 For elastomers which are not filled with carbon black: dyes, namely:
    2.3.1 Inorganic pigments, for example lithopone, titanium dioxide, iron oxide, and chrome oxide green; or 2.3.2 Organic dyes, for example azo, alizarin and phthalocyanine dyes.

3 Plasticizers for improving the processing properties, the elasticity, and the cold-behavior, namely:

3.1 For non-polar or weakly polar crude rubber types (for example natural rubber (NR), styrene-butadiene copolymers (SBR), polybutadiene (BR), isobutylene-isoprene copolymers (IIR)): mineral oil products.

3.2 For more polar types (for example acrylonitrilebutadiene copolymer (NBR) and polychlorobutadiene (CR)): phthalates (for example dibutyl and dioctylphthalate), phosphoric esters (for example tricresyl phosphate), and aromatic mineral oils.

3.3 Further processing adjuvants, for example factices (i.e vegetable oils treated with sulfur or sulfur chloride), lanoline, soft paraffin, soft polyethylene, bitumen, and pitch.

4 Age protectors for improving the resistance of the finished vulcanized good against oxygen, the action of light, and dynamic strain, namely:

4.1 For protecting elastomers the macromolecules of which contain double bonds against oxygen and ozone: antioxidants, for example amines and phenols;

4.2 Screening agents, in particular paraffinic substances, for example ceresin and ozocerite;

4.3 For retarding the hydrolysis of elastomers having the tendency to hydrolyze (for example polyurethane elastomers (PU) and ethylene-vinylacetate copolymers (EVA): polycarbodiimine.

5 Other adjuvants, namely:

5.1 Agent for influencing the stickiness, namely:

5.1.1 Agents for reducing the undesired adherence of the crude rubber during its processing, for example paraffin, lanoline, stearic acid and its salts;

5.1.2 Agents for improving the stickiness of the crude rubber during its assembly, for example colophonium, coumarone resins, alkylphenol acetylene condensates, as well as low-molecular polyethylenes.

5.2 Adhesives which are necessary for manufacturing firm joints between elastomers and metals, as well as compound materials with fabrics, for example in the tire production and for conveyor belts, namely:

5.2.1 For manufacturing metallic compound materials: for example cobalt naphthenate, recorcin resin, as well as increased quantities of sulfur;

5.2.2 For manufacturing textile compound materials: for example styrene-butadiene-vinylpyridine terpolymers in combination with resorcinol formaldehyde resins and special isocyanates.

5.3 Foaming agents for the manufacturing of porous vulcanized goods, for example sulfohydrazides (such as benzenesulfohydrazide), nitroso compounds (such as dinitrosopentamethylenetetramine and ammonium carbonate.

As a general rule, the adjuvants can be used with the commercial grain sizes in the micron-range. Their use in paste form provides the possibility of refining them, in particular to pulverize, to disperse or to degas them. This makes it possible to use coarse-grinded and therefore less expensive adjuvants, for example black carbons.

In carrying out the method of the invention, preferably said annular zone mixer of said first stage (a) is fed with all the additives.

This may be done by preparing one single paste from all additives, said single paste being introduced into said annular zone mixer of said first stage (a).

Alternatively, said additives may be shared for preparing several pastes, preferably two pastes, which are then introduced into said annular zone mixer of said first step (a), either separately or after being mixed together.

If said adjuvants are to be converted into a paste or pastes, respectively, the quantity of liquid ingredients, in particular that of the plasticizer oil, should obviously be high enough for allowing the effective forming of a paste or of pastes, respectively.

Preferably, groups of adjuvants which remain unchanged for different applications are combined into one paste. For example, when working with two pastes, one of them may colour-neutral and the other paste may be coloured. In this way it is possible to use the colour-neutral paste for the manufacturing of differently coloured elastomer mixtures, so that only the coloured paste is to be adapted to the desired colouring.

Said single paste or said pastes, respectively, may be refined before being introduced into said annular zone mixer of said first step (a), in particular by pulverization, by dispersing, or by degasification.

Since homogenous mixing of the various ingredients is the easier the quantities of the various adjuvants are equal, it is advisable to prepare first a prepaste of those adjuvants which are needed in relatively small quantities only, and to mix said prepaste with the other paste or pastes, respectively, before mixing it with the elastomer.

Alternatively, part of the adjuvants, which are in powdered form, may be directly introduced into said annular zone mixer of said first step (a) and/or part of the adjuvants may be directly introduced into said mixing unit of said second step (b). The latter is particularly useful if highly filled mixtures are to be prepared in which the quantity of plasticizer is relatively small as compared with that of the the fillers.

As it is generally known, annular zone mixers, which are used here as premixers, have a shaft provided with teeth which rotates with high speed, for example at 2000 r.p.m. (revolutions per minute), inside a smooth tube. Thereby, a turbulent annular zone is produced near the wall of the tube. The decomposition of the elastomer and its mixing with the other ingredients is essentially effected exclusively in this zone, due to the high frictional forces produced by said turbulence.

The method according to the invention may be used for preparing crosslinkable and/or thermoplastic elastomer blends from all crosslinkable or thermoplastic elastomers, and in particular from:

natural rubber (NR),
synthetic cis-1,4-polyisoprene (IR),
cis-1,4-polybutadiene (BR),
styrene-butadiene copolymer (SBR),
acrylonitrile-butadiene copolymers (NBR),
poly-2-chlorobutadiene (CR),
isobutylene-isoprene copolymers (IIR),
ethylene-propylene-dien terpolymers (EPDM),
ethylene-propylene copolymers (EPM),
ethylene-vinylacetate copolymers (EVA),
polyurethane elastomers (PU), polysulfide elastomer (PSR),
polyacrylate elastomers (AR),
polyepichlorohydrin elastomers (CHR),
sulfochlorinated polyethylene (CSM),
fluorocarbon elastomers (FE),
silicone elastomers (SIR),
1,5-trans-polypentenamers (TPR),
ethylene-proyplene-dien elastomer/polyproylene polyblend (EPDM/PP),
acrylonitrile-butadien-copolymer/polypropylene polyblend (NBR/PP),
styrene-butadiene-styrene triblock copolymer (SBS).
styrene-ethylene/butaylene-styrene triblock copolymer (SEBS).

The method according to the invention shows a number of outstanding advantages, as compared with the status of the art, namely:

The admixing of the adjuvants is extremely simple and energy-saving, and can be done in one single passage.

The total duration of mixing is essentially shortened, irrespective of whether the mixing unit used in said second step (b) is working continuously or batchwise. In the latter case, the premix may obviously be stored until the next batch can be introduced into the mixing unit.

If the adjuvants are used in paste form, a dust-free working is possible. This is an important progress in industrial hygiene.

For completing the mixing process, a kneader working batchwise, for example an internal mixer, can be used.

If the mixing process is to be continuously completed, the continuously working mixing unit can be a mixing extruder of simple and light construction, working at a low speed of rotation, for example at 100 r.p.m. (revolutions per minute).. A spindle length of 12·D to 18·D is quite sufficient. Such mixing extruders have a very high throughput, as compared with the vulcanization devices according to the status of the art.

At the same time, the completion of the mixing is extremely energy-saving, since the elastomer after its removal from the annular zone mixer is already present in the form of a powder or a granulate and is preheated. Thus it does not need to be rendered flowable or kneadable in the mixing unit by the application of heat. Accordingly, the mechanical overdimensioning of the mixing device, which was so far necessary, is dropped.

The elastomers used can - per se - be unplasticized. This not only facilitates their pulverization or granulation, respectively, but also avoids the situation where, due to insufficient shearing forces, an effective mixing is no longer possible.

PREPARATION OF THE BLENDS FOR EXAMPLES 1 TO 3

Three vulcanizable rubber blends were prepared from the following ingredients in the manner described hereafter. The "parts" referred to are parts by weight.

| No. | Component | Parts | Parts |
|---|---|---|---|
| 1 | BUNA AP 47[1) | | 100.0 |
| 2 | Zinc oxide RS | | 5.0 |
|  | 3.1 Stearic acid | 1.0 | |
|  | 3.2 Stearic acid | 1.0 | |
| 3 | Total stearic acid | | 2.0 |
| 4 | Chalk | | 250.0 |
|  | 5.1 Paraffinic/naphthenic mineral oil | 70.0 | |
|  | 5.2 Paraffinic/naphthenic mineral oil | 10.0 | |
| 5 | Total paraffinic/naphthenic mineral oil | | 80.0 |
| 6 | Iron oxide red | | 6.0 |
| 7 | Sulfur | | 7.0 |
| 8 | VULCACIT CZ[2)] | | 1.0 |
| 9 | VULCACIT LDA[3)] | | 1.0 |
| 10 | VULCACIT Thiuram[4)] | | 0.4 |
|  |  | Total | 452.4 |

[1)]EPDM = ethylene-propylene-dien terpolymer - grain size smaller than 10 mm
[2)]CPS = benzodiacetyl-2-cyclohexyl sulfenamide
[3)]ZDEC = zinc N-diethyl thiocarbamate
[4)]TMTB = tetramethyl thiuramdisulfide

EXAMPLE 1

All adjuvants (Nos. 2, 3, 4, 5, 6, 7, 8, and 10) were mixed to from one single paste. This paste, if desired after homogenization, was premixed with the elastomer (No. 1) in an annular zone mixer, the elastomer thereby being decomposed. Thereafter, the resulting premix was introduced into a mixing unit which was working batchwise, or into the material feed sector of a mixing extruder.

EXAMPLE 2

The adjuvants Nos. 2, 3.1, 4, 5.1, 7, 8, 9 and 10 were mixed to form a colour-neutral paste, and the adjuvants Nos. 3.2, 5.2 and 6 were mixed to form a coloured paste. These pastes, if desired after homogenization, were premixed with the elastomer (No. 1) in an annular zone mixer, the elastomer thereby being decomposed. Thereafter, the resulting premix was introduced into a mixing unit which was working batchwise, or into the material feed sector of a mixing extruder.

EXAMPLE 3

The adjuvants Nos. 2, 3, 7, 8, 9 and 10 were premixed to form a prepaste, and the adjuvants Nos. 4, 5 and 6 were mixed to form a main paste. Then, the two pastes were combined. The combined single paste, if desired after homogenization, was premixed with the elastomer (No. 1) in an annular zone mixer, the elastomer thereby being decomposed. Thereafter, the resulting premix was introduced into a mixing unit which was working batchwise, or into the material feed sector of a mixing extruder.

EXAMPLE 4

A typical tire mixture was prepared from the following ingredients, the "parts" referred to being again parts by weight:
100 parts rubber
10 parts plasticizer oil
60 to 80 parts carbon black
8 to 10 parts other adjuvants (including sulfur).

The rubber, the plasticizer oil and the other adjuvants were continuously premixed in an annular zone mixer rotating at 2000 r.p.m. (revolutions per minute). The resulting blend and the carbon black were then introduced into a kneader which was working batchwise, for example an internal mixer, or into a mixing extruder which was working continuously. There, the elastomer blend was completed.

What is claimed is:
1. A method for preparing mixtures comprising a thermo-crosslinkable and/or thermoplastic elastomer and a plasticizer oil, said method comprising the steps of

(a) providing premix ingredients comprising said elastomer in particulate form and additives comprising at least part of said plasticizer oil;

(b) continuously introducing said premix ingredients into an annular zone mixer;

(c) continuously forming a premix of said premix ingredients by operating said annular zone mixer at a high speed which is effective to subject said premix ingredients to high turbulence and frictional forces in the annular zone of said annular zone mixer whereby mixing of the elastomer with other ingredients is effected essentially exclusively in the annular zone, the duration of operation of the annular zone mixer being effective to embed said additives into the polymer matrix of said particulate elastomer; and (d) subjecting said premix to completion of mixing in a kneader mixing unit in which the premix is kneaded.

2. The method of claim 1 wherein said premix ingredients comprise at least one additive selected from the group consisting of a crosslinking agent, a catalyst, a filler, an inorganic pigment, an organic dye, an age protectant, a lubricant, ad adhesive, an anti-foaming agent, and combinations thereof.

3. The method of claim 1 wherein an additive is added to the premix of step (c) prior to the completion of mixing.

4. The method of claim 1 wherein all of said plasticizer oil is added in step (a).

5. The method of claim 1 wherein said kneader mixing unit of step (d) is a mixing extruder or an internal mixer.

6. The method of claim 1 wherein said premix ingredients include a vulcanizer and a catalyst.

7. The method of claim 1 wherein said premix ingredients comprise additives in addition to plasticizer oil and said annular zone mixer is fed in step (b) with all additives.

8. The method of claim 7 wherein a single paste is prepared from all additives, said single paste being introduced into said annular zone mixer in step (b).

9. The method of claim 7 including the step of preparing several pastes of said additives and introducing said several pastes into said annular zone mixer in step (b).

10. The method of claim 9 wherein two pastes are prepared.

11. The method of claim 10 wherein one paste is colour-neutral and the other paste is coloured.

12. The method of claim 8 wherein said paste is refined before being introduced into said annular zone mixer in step (b).

13. The method of claim 12 wherein said paste is refined by pulverization, by dispersing, or by degasification.

14. The method of claim 9 wherein said pastes are refined before being introduced into said annular zone mixer in step (b).

15. The method of claim 14 wherein said pastes are refined by pulverization, by dispersing, or by degasification.

16. The method of claim 9 wherein said pastes are separately introduced into said annular zone mixer in step (b).

17. The method of claim 9 wherein part of said additives are combined to form a prepaste which is mixed with at least one of the other pastes before being introduced into said annular zone mixer in step (b).

18. The method of claim 1 wherein said premix ingredients comprise additives in addition to plasticizer oil and a part of said additives, in powder form, is directly introduced into said annular zone mixer in step (b).

19. The method of claim 8 wherein a part of said additives, in powder form, is directly introduced into said annular zone mixer in step (b).

20. The method of claim 1 wherein said premix ingredients comprise additives in addition to plasticizer oil and part of said additives, in powder or paste form, is directly introduced into said mixing unit in step (d).

21. The method of claim 18 wherein additionally part of said additives, in powder or paste form, is directly introduced into said mixing unit in step (d).

22. The method of claim 19 wherein additionally part of said additives, in powder or paste form, is directly introduced into said mixing unit in step (d).

* * * * *